Aug. 4, 1964  W. I. ALEXANDER  3,143,198
AUTOMATIC VENDING MACHINE
Filed June 20, 1963  3 Sheets-Sheet 1

INVENTOR.
WILLIAM I. ALEXANDER
BY
Davis, Hoxie, Faithfull & Hapgood
ATTORNEYS.

INVENTOR.
WILLIAM I. ALEXANDER

Aug. 4, 1964 W. I. ALEXANDER 3,143,198
AUTOMATIC VENDING MACHINE
Filed June 20, 1963 3 Sheets-Sheet 3

INVENTOR.
WILLIAM I. ALEXANDER
BY
Davis, Hoxie, Faithfull & Hapgood
ATTORNEYS.

United States Patent Office 3,143,198
Patented Aug. 4, 1964

3,143,198
AUTOMATIC VENDING MACHINE
William I. Alexander, Harrison, N.Y., assignor to Mayday, Inc., Newark, N.J., a corporation of New Jersey
Filed June 20, 1963, Ser. No. 289,192
5 Claims. (Cl. 194—15)

The present invention relates to vending machines and more particularly to an automatic vending machine for phonograph records.

At the present time phonograph records are manufactured or "pressed" in a factory and sold to a wholesaler, who, in turn, sells the records to the retailer. In the event a record fails to sell, the retailer returns the record to the wholesaler and the wholesaler returns it to the factory, where it is used for scrap. The wholesalers and retailers must maintain an inventory of records, which requires the use of their capital. But, even with proper inventory control, it is often impossible to furnish the desired records to the proper stores quickly enough to satisfy the public's demand.

Another disadvantage of the present system of record distribution, especially in the case of popular recordings, is that in many cases one selection on one side of the record is relatively popular while the other selection is unpopular. The customer, in order to obtain the popular selection, must buy the record having the selection which he does not particularly desire.

The distributing costs in the present system, including the cost of returning unwanted records and the time of sales personnel, are quite high, which results in relatively high prices for the records compared to their manufactured cost.

It is an objective of the present invention to provide popular records having about the same sound quality as presently available and at less cost to the consumer.

It is another objective of the present invention to have the records available for purchase at the same place and time in which the consumers normally hear records—the thousands of "jukeboxes" or automatic record players distributed throughout the country.

It is a further objective of the present invention that the consumer have the choice of any two selections available on a record which he purchases, so that the consumer buys a record both of whose sides have selections which he desires.

It is a still further objective of the present invention to eliminate the problem of phonograph record inventories by ensuring that only those records which are bought are produced and having available at all times as many different records as may be desired.

In accordance with the present invention, an apparatus is provided which stores in one or more stacks from 50 to as many as 250 records. These records may be played by inserting the proper coins in a slot and selecting the record. The record is automatically transferred from the stack to a phonograph turntable, the record played, and, at its conclusion, the record returned to its stack. The apparatus also includes a record pressing machine which is operated with thin stampers (masters or matrices) which are selected in much the same manner as the records which are played. The customer deposits the proper amount of coins and pushes buttons to choose which selections he wants impressed upon the record blank. The machine automatically selects two stampers from stacks of stampers and places them between the pressers, places a record blank between the stampers, closes the press, opens the press, returns the stampers to their stacks, and places the completed record into a slot so that it is conveyed to the customer.

Other objectives of the present invention will be apparent from the description of the preferred embodiment taken in conjunction with the accompanying drawings, in which.

Figure 1:
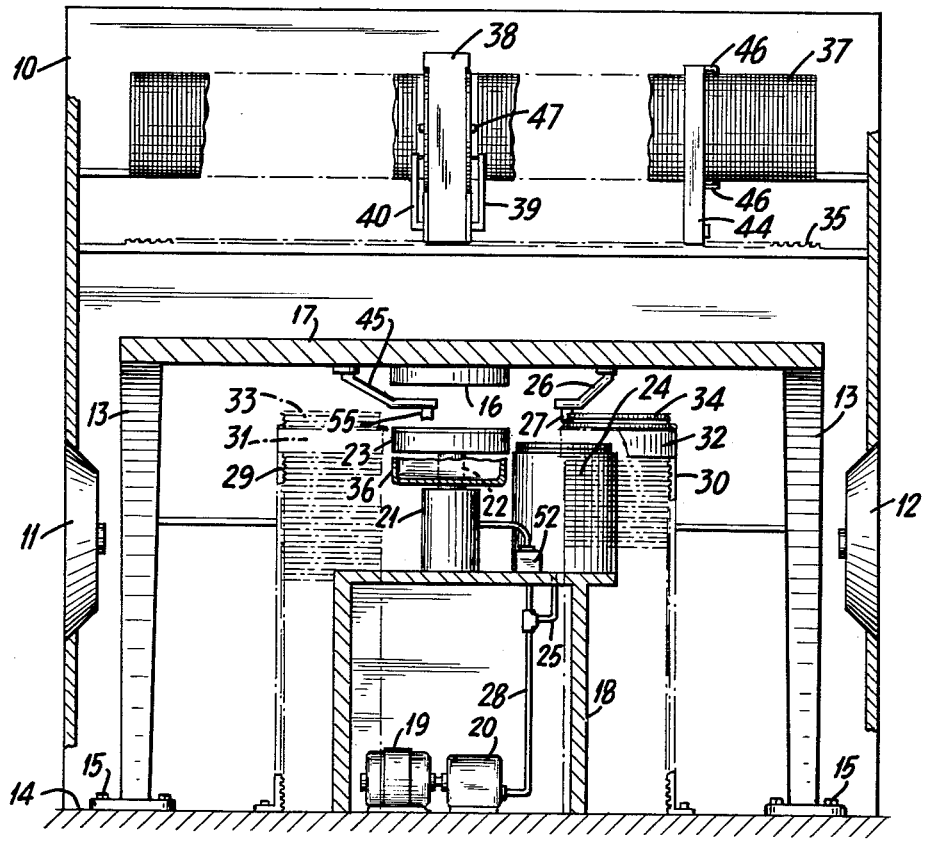
FIG. 1 is a cut-away front view of a preferred embodiment of the invention.
Figure 2:
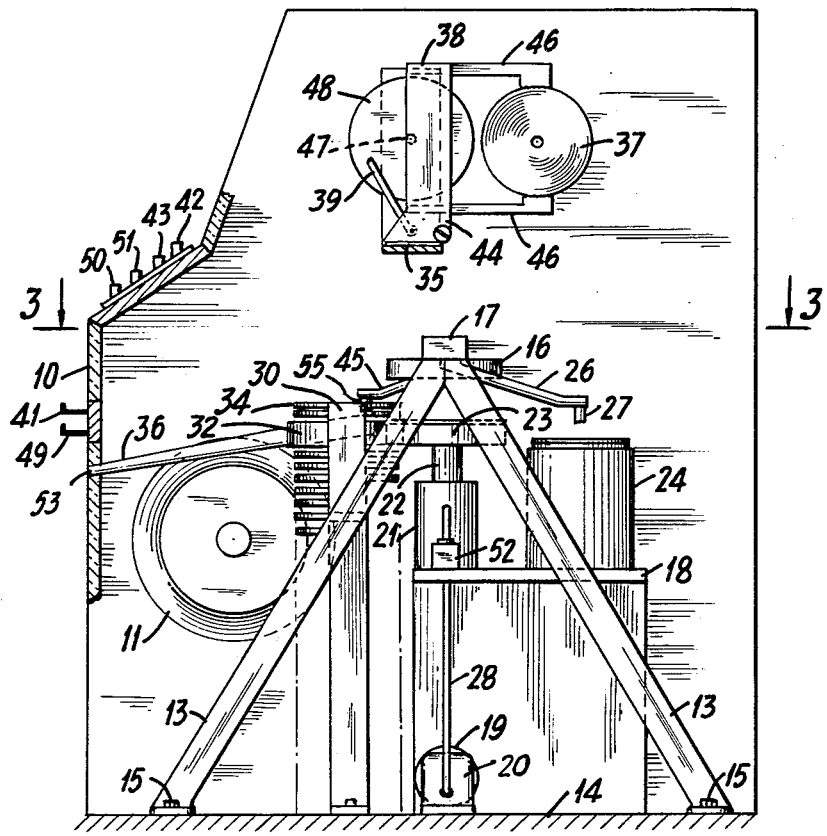
FIG. 2 is a cut-away side view of the same embodiment.
Figure 3:
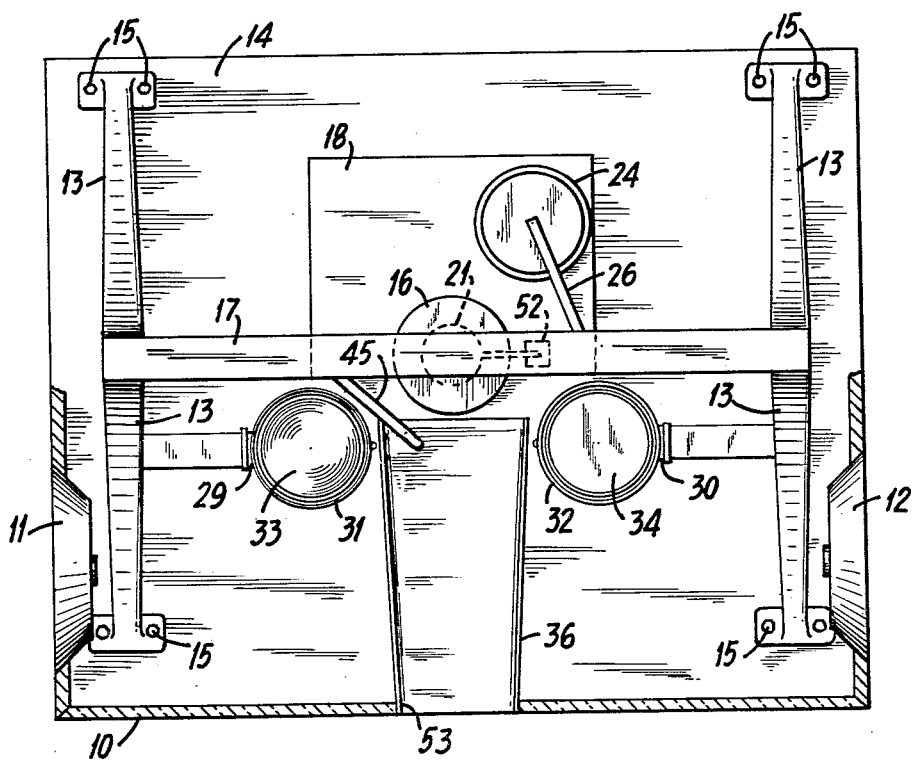
FIG. 3 is a top view taken along line 3—3 of FIG. 2.

As shown in FIG. 1, the first embodiment includes a case 10 enclosing the mechanism. The case has, preferably, as much transparent area as possible at its front to enable customers to watch the operation of the mechanism. Two loudspeakers 11 and 12 are connected to the sides of case 10 on opposite sides. The case has openings through which the sound from the speakers is emitted. A strong steel double U-shaped member 13 is affixed to the bottom 14 of the case 10 by means of bolts 15. A fixed platen (anvil) 16 is attached to the top 17 of the U-shaped member 13. A strong steel table 18 fits within the U-shaped member.

An electric motor 19, whose shaft is connected to the shaft of oil hydraulic pump 20 is located beneath table 18. A hydraulic cylinder 21 having extensible piston 22 is mounted on the table 18. Pump 20 is connected to cylinder 21 by hydraulic line 28 through electrically operated valve 52. Platen 23 is attached to the top of piston 22. A storage cylinder 24 containing record blanks is also mounted on the table 18. The storage cylinder has an internal piston hydraulically operated from hydraulic line 25 so that the top record of the stored pile of blanks is always kept at the same level. A suitable device of this type is manufactured by American Machine and Foundry Company. A swingable arm 26 having a suction pick-up nozzle 27 is attached to member 17 and, in its pick-up position, is located above storage cylinder 24. The arm 26 is arranged so that, upon actuation, it removes a single record blank from cylinder 24 and deposits it upon platen 23. Two toothed tracks 29 and 30 are vertically mounted on opposite sides within member 13 and attached to it. Transfer arms 31 and 32 are mounted on the tracks and move along it when actuated. Arms 31 and 32 are the same types as are presently used on some types of "juke boxes" to move records from their stack to the turntable. Piles 33 and 34 of separated stampers are stacked in pre-arranged order in racks along tracks 29 and 30, respectively. These stampers are thin, about 1/16 in. thick, and strong. They are the "male" forms which press the conventional type of flat disk record, which is the "female." The stampers may be made from hard durable plastic such as Du Pont's "Delrin" or Celanese Co.'s "Celcon," which may be molded to about 0.02 accuracy. Metal stampers, which may be made by precision investment casting to an accuracy of 0.001, may also be used. The stampers are preferably thin and light. If steel stampers are used, then the transfer arms 31 and 32 may have electromagnets to pick up the stampers and then release them.

A revolvable transfer arm 45 is attached to top member 17 and is positioned to pick up the stamped record from mandrel 23 and deposit it into slot 36 which leads to the exterior of case 10.

A geared bar 35 is positioned near the top of case 10. A transfer arm 44, similar to arms 32 and 31, is movable sideways along bar 35. The arm 44 removes a record from the sidewise stacked group of records 37 and carries it to turntable member 38. Turntable 38 has an internal motor to rotate the record and swingable record arms 39 and 40. The needles in arms 39 and 40 are connected to the conventional types of transducers and amplifiers. Preferably the needle, transducers and amplifiers are of the "stereo" type. The amplifier is electrically connected to loudspeakers 11 and 12.

In operation, a customer, to play a record, inserts a coin, for example ten cents, into coin slot 41 and selects the desired record to be played by depressing buttons 42 and 43. The transfer arm 44 is activated and moves sideways along geared bar 35 until it is in front of the selected record. The fingers 46 of arm 44 are swung around the record and pick it up. The transfer arm 44 moves sideways along bar 35 until the record is positioned on turntable member 38 so that the spindle 47 of the player member is within the hole of the record. A record arm 39, having a relatively strong spring, swings over the record and is positioned at the start of the record's groove. The motor within player member 38 turns the turntable 48 and rotates the record. The needle of arm 39 moves within the grooves of the record, its movement amplified by the amplifier, and the amplified sound broadcast over the loudspeakers. At the conclusion of the record, the record arm 39 returns to its original position and the transfer arm 44 picks up the record and returns it to its original storage place. This type of mechanism is well known and is one of the conventional types of "jukebox" transfer mechanisms. If the customer likes the record which was played and desires a phonograph record copy or otherwise desires a record, he inserts the proper coins into the stamper coin slot 49; for example, 50 cents may be inserted. After inserting the coins, the customer depresses stamper buttons 50 and 51 which selects the two impressions (selections) which he wants recorded, one on each side of the record. Activation of the buttons starts a timing motor which operates a shaft upon which is affixed a plurality of cams which operate microswitches. The switches select the different functions to be performed and the timing of the functions. These functions, all of which are automatically programmed by the cam switches, are as follows: Transfer arm 31 is driven vertically along its track 29 until it reaches the stamper selected. The fingers of arm 31 pick up the selected stamper from the stack and carry it to near the top of the bar. The transfer arm swings out and places the selected stamper on the lower platen 23. The fingers then release the stamper so that the stamper rests on the platen and the transfer arm returns to its position. The swingable arm 26 is activated so that it is lowered to the stack of records in storage cylinder 24. The nozzle 27 of arm 26 picks up a blank from the storage cylinder 24 and the arm 26 swings until the blank is over the lower platen 23. The record blank is released so that it rests on top of the stamper selected from group 33. The second transfer arm 32 is activated so that it moves vertically along gear track 30. The arm 32 stops at the selected stamper from group 34, picks out the stamper, and moves it to near the top of track 30. The arm 32 swings so that it positions the second selected stamper on top of the record blank. The arm releases the second stamper and returns it to the arm's original position. Oil is pumped from pump 20 through switch 52 into cylinder 21. This causes piston 22 to be extended upwardly and presses the record blank between the two stampers. The record blank is of deformable material, such as a vinyl plastic, so that it may be cold stamped under the available pressures. With an 8-ton press, pressure may be obtained on the standard 45 r.p.m. popular size record blank of about 400 lbs. per square inch. The pressing operation may be relatively fast as the pressure alone determines the set of the plastic blank. For example, the pressure may be maintained on the blank for 10 seconds. At the end of the forming period, the oil is pumped out of cylinder 21 and piston 22 is depressed. The transfer arm 32 swings over the platen 23 and removes the second stamper and replaces it in its position in its stamping group 34. The arm 45 swings over the lower platen 23 and picks up the completed pressed record with its nozzle 55 and swings until the completed record is over the funnel 36 which leads to the exterior slot 53. The arm 45 drops the completed record down the funnel and returns to its original position. Transfer arm 31 swings over platen 23 and picks up the first stamper and returns it to its storage place. The stampers in group 33 have their grooves facing upwardly and the stampers in group 34 have their grooves facing downwardly.

It is understood that modifications may be made in the present invention within the scope of the subjoined claims. For example, the platens 16 and 23 may be heated. An electric heater which is operated from cams on the timing shaft is satisfactory. Although the heating elements add to the cost of the device, it is possible, by using such elements, to reduce the pressures required from the cylinder 21.

As another example of a possible modification, the stampers may have grooves on both their front and back sides. In that case, the stampers are piled in one group and the transfer arm selects a stamper, turns it over to its correct side and deposits it on the platen. It would, of course, not be possible to make a record both of whose sides are selected from the same platen. This modification, however, decreases the required storage space for the stampers and reduces the number of required transfer arms.

As another example, instead of using a formed vinyl blank, the record blank may be in the form of sintered plastic material. The sintered material is then formed under the pressure of the hydraulic press into the completed record.

As still another example of a possible modification, the storage cylinder 24 with its associated transfer arm 26 may be eliminated and a funnel, whose exit port is positioned over the platen, used to deliver record blanks or plastic pellets which would be formed onto the completed record.

There are other types of transfer arms well known in the art which may be utilized with the present invention. The type of transfer arm used in U.S. Patent 2,601,501 may be used to place blanks on platen 23. Another example of a suitable transfer mechanism is the type of transfer arm manufactured by Seeburg in which the turntable member moves along the geared track until it arrives at the record selected to be played. In the Seeburg device the record is pushed out from its stack and swung onto the turntable. This type of traveling turntable may be utilized in the record playing portion of the apparatus and also in the stamping portion. In that case both the upper and lower platens are movable. The stampers are fixed in position in two racks arranged along the tracks of the traveling press members. A blank is deposited between the press members and the press members travel along until they arrive opposite the first stamper. The blank is pressed against the stamper. The platens are opened, the first stamper returned to its storage position, and the blank turned over. The platens then move until they arrive alongside the second stamper which swings between the platens. The platens close again, pressing the second side of the blank. After the second closing and the return of the second stamper to its storage position, the platens would open and the completed records removed by a transfer arm.

As another modification, if the stampers are of a magnetic material such as steel, they may be held firmly to the platens 16 and 23 by means of electromagnets within the platens. In addition, the transfer arms 31 and 32 may pick up the magnetically responsive stampers by means of electromagnets within the arms. The timing of the operation of the various electromagnets is that the transfer arm selects the stamper, swings it over to the platen, releases it, and the platen magnetically holds the stamper. The operation of such electromagnets is timed by the cams operated from the timing motor.

As another modification, relays may be connected to the coin operated slots so that the money deposited to play the records is credited against the purchase of a record. A suitable circuit for such crediting is found in FIGS. 9 and 10 of U.S. Patent 2,679,917. If the records cost ten cents each to play and the price of a stamped record is seventy cents, then, if two records are played, the twenty cents is credited, so that only an additional fifty cents need be deposited to receive a stamped record. In this arrangement the buttons selecting the stampers may be interconnected with those selecting the records, so that automatically on the insertion of the additional fifty cents the stampers corresponding to the records just played will be selected.

As another modification, the record blank, instead of being formed from powder or a blank disk, may be formed from a sheet of material which is moved between the platens. The edges of the platens have knife edges to cut the record from the sheet of material. Suitable materials for this process are mentioned in U.S. Patent 3,052,586.

I claim:

1. A record playing and manufacturing machine comprising, in combination
   a plurality of phonograph records, a rotatable phonograph turntable, a transfer arm adapted to select a record and position the selected record on the turntable, a selection switch, a coin operated switch connecting the selection switch to the transfer arm,
   a phonograph arm including a transducer to convert sounds recorded on the record into electrical signals, means to position the phonograph arm on the record positioned on the turntable, an amplifier to amplify the signals, a loudspeaker connected to the amplifier,
   a group of phonograph record pressing stampers, a second selection switch, a movable press platen and a cooperating second press platen, a transfer arm adapted to select a stamper and position the selected stamper on one of the platens, coin operated means connecting the second selection switch to the transfer arm, a source of record blank material, means to deposit the record blank material between the two platens, means to operate the platens so that they come together and form an impressed record, and means to remove the completed pressed record from between the platens,
   in which machine, upon depositing of a coin and operation of the selection switch, the transfer arm positions the selected stamper on one of the platens, record blank material is positioned on the selected stamper, the press platens are closed, the record pressed, the platens opened and the record removed.

2. A record manufacturing machine as in claim 1 wherein the record blank material is a plurality of flat plastic disks.

3. A record manufacturing machine as in claim 1 wherein the platens are heated.

4. A record manufacturing machine as in claim 1 wherein the stampers are of metal and the transfer arm and the platens have electromagnets to temporarily hold the stampers.

5. A record manufacturing machine as in claim 1 wherein the platens are operated by a hydraulic ram.

References Cited in the file of this patent

UNITED STATES PATENTS

| | | |
|---|---|---|
| 2,679,917 | Andres | June 1, 1954 |
| 2,802,473 | Keefe | Aug. 13, 1957 |
| 2,862,233 | Brown | Dec. 2, 1958 |